(12) United States Patent
Qin et al.

(10) Patent No.: US 9,015,128 B2
(45) Date of Patent: Apr. 21, 2015

(54) METHOD AND SYSTEM FOR MEASURING SOCIAL INFLUENCE AND RECEPTIVITY OF USERS

(71) Applicant: Share This Inc., Palo Alto, CA (US)

(72) Inventors: Chao Qin, Sunnyvale, CA (US); Yan Qu, Los Altos, CA (US)

(73) Assignee: ShareThis, Inc., Palo Alto, CA (US)

( * ) Notice: Subject to any disclaimer, the term of this patent is extended or adjusted under 35 U.S.C. 154(b) by 30 days.

(21) Appl. No.: 13/687,692

(22) Filed: Nov. 28, 2012

(65) Prior Publication Data

US 2014/0149418 A1 May 29, 2014

(51) Int. Cl.
*G06F 17/30* (2006.01)
*G06Q 10/00* (2012.01)

(52) U.S. Cl.
CPC ...................... *G06Q 10/00* (2013.01)

(58) Field of Classification Search
CPC .......... G06F 17/3089; G06F 17/30598; G06F 17/30604
USPC ........................................................ 707/672
See application file for complete search history.

(56) References Cited

U.S. PATENT DOCUMENTS

| | | | | |
|---|---|---|---|---|
| 7,278,105 B1* | 10/2007 | Kitts | | 715/736 |
| 7,856,449 B1* | 12/2010 | Martino et al. | | 707/784 |
| 8,793,255 B1* | 7/2014 | Bilinski et al. | | 707/740 |
| 2008/0114737 A1* | 5/2008 | Neely et al. | | 707/3 |
| 2010/0145771 A1* | 6/2010 | Fligler et al. | | 705/10 |
| 2011/0166904 A1* | 7/2011 | Arrowood et al. | | 705/7.23 |
| 2012/0165050 A1* | 6/2012 | Doni | | 455/466 |
| 2012/0330869 A1* | 12/2012 | Durham | | 706/16 |
| 2013/0018685 A1* | 1/2013 | Parnaby et al. | | 705/7.13 |
| 2013/0018698 A1* | 1/2013 | Parnaby et al. | | 705/7.29 |
| 2013/0018838 A1* | 1/2013 | Parnaby et al. | | 706/52 |
| 2013/0018957 A1* | 1/2013 | Parnaby et al. | | 709/204 |
| 2013/0073336 A1* | 3/2013 | Heath | | 705/7.29 |
| 2013/0073387 A1* | 3/2013 | Heath | | 705/14.53 |
| 2013/0073388 A1* | 3/2013 | Heath | | 705/14.53 |
| 2013/0073389 A1* | 3/2013 | Heath | | 705/14.54 |
| 2013/0073400 A1* | 3/2013 | Heath | | 705/14.73 |
| 2013/0073473 A1* | 3/2013 | Heath | | 705/319 |
| 2013/0103667 A1* | 4/2013 | Minh | | 707/709 |
| 2013/0212699 A1* | 8/2013 | Pollard | | 726/27 |
| 2013/0337852 A1* | 12/2013 | Doni | | 455/466 |

* cited by examiner

*Primary Examiner* — Baoquoc N To (74) *Attorney, Agent, or Firm* — Sughrue Mion, PLLC (57) ABSTRACT

Systems and methods are disclosed for characterizing one or more users accessing a plurality of web pages. In an embodiment, a social sharing graph is generated based on the one or more log records. The one or more log records are indicative of the one or more user activities. A first and a second score are assigned to preferably each of the one or more users in the social sharing graph based on the one or more log records. Finally, the one or more users are categorized in a first category and a second category based on the first score and the second score.

19 Claims, 6 Drawing Sheets

METHOD AND SYSTEM FOR MEASURING SOCIAL INFLUENCE AND RECEPTIVITY OF USERS

FIELD

The present disclosure relates, in general, to a data mining system. More specifically, the present disclosure relates to a data mining system for characterizing the social influence and receptivity of one or more users based on one or more user activities.

BACKGROUND

Internet usage has increased exponentially in recent years due to multifold increase in the number of internet users. At any instant, there may be millions of users involved in a variety of activities on the Internet. Such activities may include, but are not limited to, searching for content, visiting a webpage, viewing a video blog, social networking, listening to an audio file, online shopping, online gaming, sharing content, downloading content, etc. Such user activities may be indicative of a user's interest and/or online behavioral pattern. It may be desirable, in certain scenarios, to collect and analyze data associated with the user activities to draw inferences that can be used for commercial purposes.

SUMMARY

In an implementation, a method for characterizing one or more users accessing a plurality of web pages is disclosed. The method includes generating a social sharing graph based at least in part on at least one log record received from a tracking component located on preferably each of the plurality of web pages. The at least one log record corresponds to one or more user activities of the one or more users on each of the plurality of web pages. The social sharing graph is indicative of a relationship between the one or more users. Further, the method includes assigning a first score and a second score to preferably each of the one or more users depicted in the social sharing graph based at least in part on the at least one log record. The first score is indicative of an information influencing capability and the second score is indicative of an information receiving capability of the one or more users. Further, the method includes comparing the first score and the second score with a first threshold score and a second threshold score respectively. Additionally, the method includes classifying a first set of users from the one or more users into a first category based at least in part on the comparison of the first score with the first threshold score. Finally, the method includes classifying a second set of users from the one or more users into a second category based at least in part on the comparison of the second score with the second threshold score.

In another implementation, a user classification system is disclosed. The user classification system includes a tracking application module configured to receive at least one log record corresponding to one or more user activities of preferably each of one or more users on the plurality of web pages. The user classification system further includes a social graph manager configured to generate a social sharing graph based, at least in part, on the at least one log record. The social sharing graph is indicative of a relationship between the one or more users. The system further includes a user score module configured to assign a first score and a second score to preferably each of the one or more users depicted in the social sharing graph based at least in part on the at least one log record associated with each of the one or more users. Further, the user classification system includes a score comparing module configured to compare the first score and the second score with a first threshold score and a second threshold score respectively. The first score is indicative of an information influencing capability and the second score is indicative of an information receptive capability of the one or more users. Finally, the user classification system includes a user classification module configured to classify the one or more users into a first category and a second category based at least in part on the comparison of the first score and the second score with the first threshold score and the second threshold score respectively.

BRIEF DESCRIPTION OF DRAWINGS

The following detailed description of the various embodiments will be better understood when read with reference to the appended drawings. The embodiments are illustrated by way of examples, and are not limited by the accompanying figures, in which like references indicate similar elements.

DETAILED DESCRIPTION

The disclosed embodiments can be best understood with reference to the figures and detailed description set forth herein. Various embodiments are discussed below with reference to the figures. However, those skilled in the art will readily appreciate that the detailed description given herein with respect to these figures is just for explanatory purposes as the disclosed methods and systems extend beyond the described embodiments.

Definition Of Terms:

Social sharing graph: A social sharing graph corresponds to a graphical representation of links prevailing between one or more users. The links are indicative of user relations, such as sharing of similar interest (e.g. an interest graph), proximity of locations (e.g. location-based social networks), or communication connections (e.g. email networks). The links may be indicative of one or more user activities performed by each of the one or more users. For example, user A has shared content with user B and user C. In the social sharing graph, user B and user C are connected to user A via links between the two users. The links indicate the sharing of the content between the user A and the user B, and the user A and the user C, respectively.

Sharer: A sharer is a user who performs the operation of sharing content with one or more users.

Clicker: A clicker is a user who clicks on the content shared by a sharer.

Log record: A log record is data that is indicative of user activities performed on the Internet. Further, the log record may include, but is not limited to, a cookie, a timestamp, an event type, a sharing channel, a content identifier, one or more domain information, one or more Uniform Resource Locator (URL), one or more referring URLs, Internet Protocol (IP) address, and a browser agent.

Tracking application: A tracking application corresponds to a software application which when installed on a web server results in an embedded tracking component in a web page hosted by the web server.

Tracking component: A tracking component is a web-based component that is part of a web page configured to gather log records. The log records facilitate tracking of a user activity. Examples of the tracking component may include, but are not limited to, a widget, a button, a link, a hypertext installed on a domain web server, a web beacon and a link.

User activity: A user activity corresponds to the activities performed by a user on the Internet. Examples of the user activity include, but are not limited to, a sharing activity, a clicking activity, a searching activity, and a web page view activity. Sharing activity entails sharing of web content by the user with other users on the Internet. Clicking activity corresponds to clicks on web content shared by one or more users. Searching activity corresponds to searching for web content on the Internet by the user.

Influence score: An influence score is a measure of influence of a user on one or more users in a networked environment. In an embodiment, the influence score is directly proportional to the number of clickers, i.e., the unique number of users, or the number of clicks, i.e., the total click events responding to the web pages shared (shares) by the sharer. In another embodiment, if the influence score of the user is high, then a receptivity score of the same user is less.

Receptivity score: The receptivity score is a measure of receptiveness of a user to content shared by other users in a networked environment. Receptivity can be indicated by clicking on the shared content, re-share of the shared content, comment on the shared content, etc. In an embodiment, the receptivity score is directly proportional to number of sharers (or shares) a user responds to. In another embodiment, if the receptivity score of the user is high, then the influence score of the same user is less.

One user's influence and receptivity scores are generally independent. For example, the influential user can be susceptible to accept others' options. The two scores measure different aspects of one user's social activities.

Figure 1:
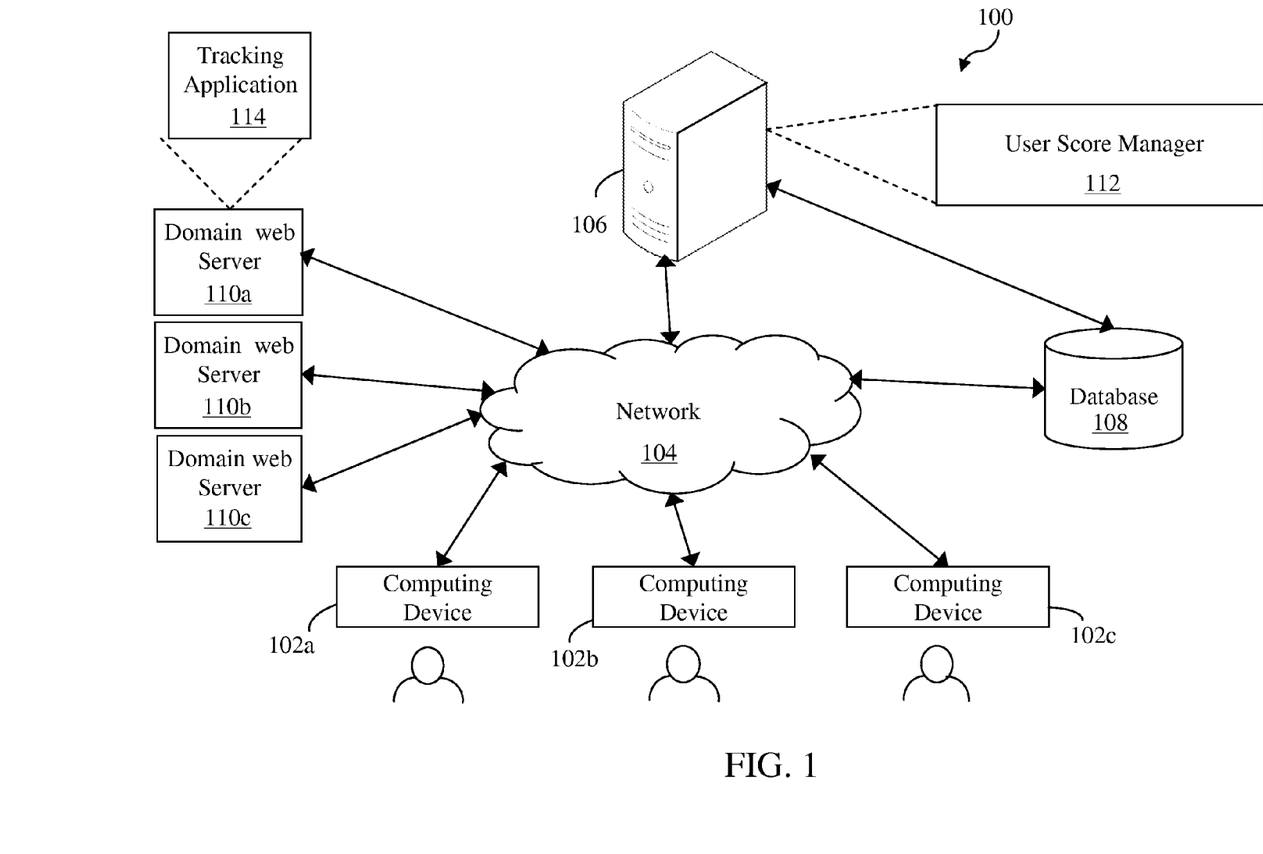
FIG. 1 illustrates a block diagram of a data mining system in accordance with an embodiment.

FIG. 1 illustrates a block diagram of a data mining system 100 in accordance with an embodiment. The data mining system 100 includes one or more computing devices 102a, 102b and 102c (hereinafter referred to as computing device 102), network 104, a web analytic server 106, a database 108, one or more domain web servers 110a, 110b and 110c (hereinafter referred to as domain web server 110). The web analytic server 106 further includes a user score manager 112. A tracking application 114 is installed on preferably each of the one or more domain web servers (110a, 110b, and 110c).

The computing device 102 corresponds to a device capable of receiving an input from a user on a user interface displayed on a display screen. Examples of the computing device 102 may include, but are not limited to, laptops, televisions, tablets computers, desktops, mobile phones, gaming consoles and other such devices with a display screen that displays one or more web pages. The computing device 102 includes a user interface that enables the user to perform one or more user activities on a web page hosted by the domain web server 110. Although three computing devices have been shown in FIG. 1, it may be appreciated that the disclosed embodiments can be implemented for a larger or smaller number. It may also be appreciated that, for a larger number of computing devices, the web analytic server 106 may be implemented as a cluster of computing devices configured to jointly perform the functions of the web analytic server 106.

The network 104 corresponds to a medium through which the content and the messages flow between the various components (e.g. the computing device 102, the web analytic server 106, the database 108, and the domain web server 110) of the data mining system 100. Examples of the network 104 may include, but are not limited to, a television broadcasting system, an IPTV network, a Wireless Fidelity (WiFi) network, a Wireless Area Network (WAN), a Local Area Network (LAN) or a Metropolitan Area Network (MAN). Various devices in the data mining system 100 can connect to the network 104 in accordance with various wired and wireless communication protocols such as Transmission Control Protocol and Internet Protocol (TCP/IP), User Datagram Protocol (UDP), and 2G, 3G or 4 G communication protocols.

In an embodiment, a web analytic server 106 corresponds to a web analytic system having capabilities to extract and analyze data for commercial purposes. The web analytic server 106 includes the user score manager 112 configured to assign an influence score and a receptivity score to each of the one or more users based at least in part on one or more user activities performed by preferably each of the one or more users. In addition to the user score manager 112, the web analytic server 106 may include various analytical tools. Such analytical tools may further include, but are not limited to, a tracking tool, a content categorization tool, a social behavior analytic tool, a social influence analytic tool, an audience segmentation tool, a user modeling tool, a campaign analytic tool, a campaign optimization tool, and a geographical sharing map generation tool. The web analytic server 106 may extract the data from the database 108 using various querying languages, such as, Structured Query Language (SQL), 4D Query Language, Object Query Language, and Stack Based Query Language (SBQL).

In an embodiment, the database 108 corresponds to a storage device that stores data required by the web analytic server 106 to perform one or more operations. For example, the database 108 can be configured to store data related to at least one log record, a social sharing graph G and a user profile associated with each of the one or more users. The database 108 can be implemented by using several technologies that are well known to those skilled in the art. Some examples of technologies may include, but are not limited to, MySQL®, Microsoft SQL®, etc. In an embodiment, the database 108 may be implemented as cloud storage. Examples of cloud storage may include, but are not limited to, Amazon E3®, Hadoop® distributed file system, etc.

The domain web server 110 corresponds to a data storage system that stores data and information required to host one or more web pages corresponding to a plurality of content publishers. Examples of the domain web server 110 may include, but are not limited to, Apache® web server, Microsoft® IIS server, Sun® Java System Web Server, etc.

The tracking application 114 when installed on the domain web server 110 results in an embedded tracking component in a web page hosted by the domain web server 110. The tracking component tracks and gathers log records. The tracking component is configured to send the log records to the web analytic server 106 and the database 108 in real time.

In an embodiment, the one or more users perform one or more user activities on the one or more web pages hosted by the one or more domain web servers 110. The tracking application 114 tracks and stores the one or more user activities as the one or more log records. The web analytic server 106 receives at least one log record from the tracking application 114. Based on the at least one log record, the web analytic server 106 generates the social sharing graph G. In an embodiment, the web analytic server 106 stores the social sharing graph G in the database 108.

Figure 2:
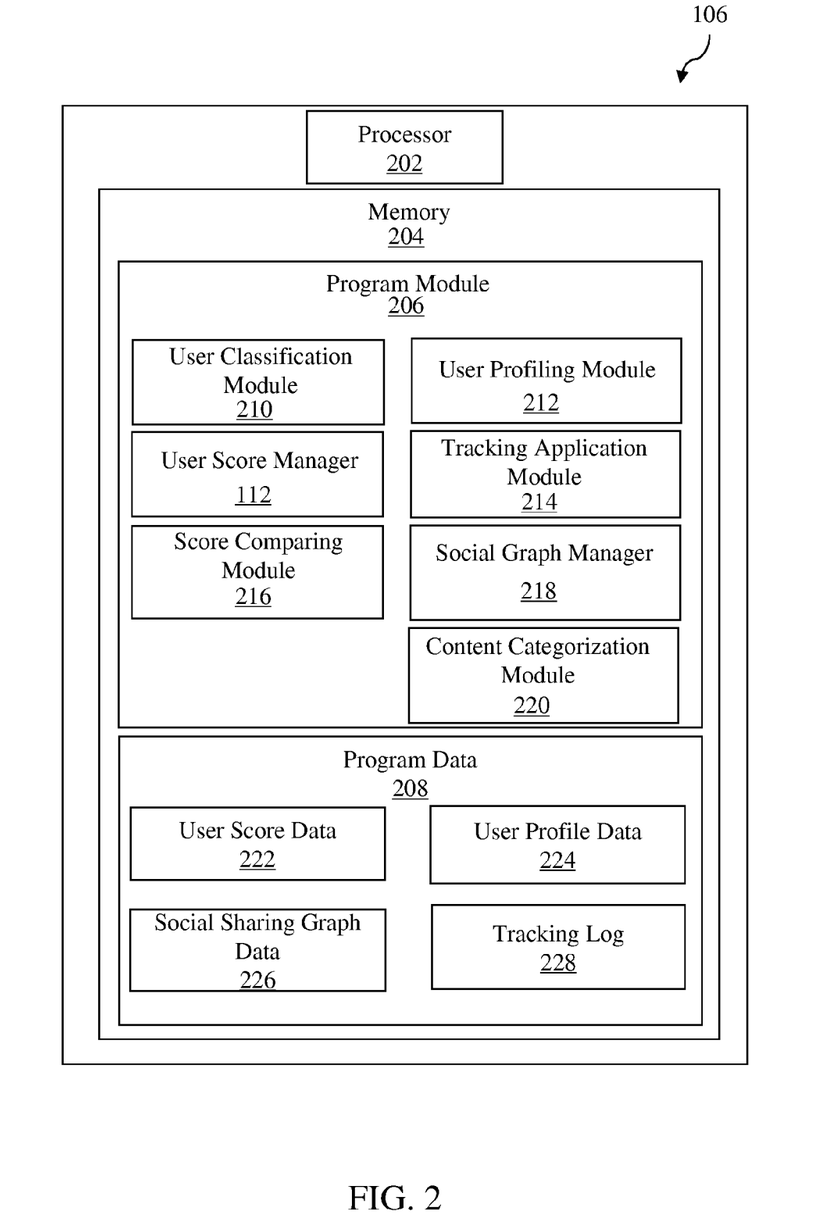
FIG. 2 illustrates a block diagram of a web analytic server in accordance with an embodiment.

FIG. 2 illustrates a block diagram of the web analytic server 106 in accordance with an embodiment. FIG. 2 is explained in conjunction with FIG. 1. The web analytic server 106 includes a processor 202 and a memory 204. The processor 202 is coupled to the memory 204. The processor 202 is configured to execute a set of instructions stored in the memory 204. The processor 202 can be realized through a number of processor technologies known in the art. Example of the processor 202 can be X86 processor, RISC processor, ASIC processor, CSIC processor, or any other processor.

The memory 204 is configured to store data and a set of instructions or modules. Some of the commonly known memory implementations can be, but are not limited to, a random access memory (RAM), read only memory (ROM), hard disk drive (HDD), and secure digital (SD) card.

The memory 204 includes a program module 206 and a program data 208. The program module 206 includes a user classification module 210, a user profiling module 212, the user score manager 112, a tracking application module 214, a score comparing module 216, a social graph manager 218, and a content categorization module 220. Although various modules in the program module 206 have been shown in separate blocks, it may be appreciated that one or more of the modules may be implemented as an integrated module performing the combined functions of the constituent modules.

The program data 208 includes user score data 222, user profile data 224, social sharing graph data 226, and tracking log 228.

The user classification module 210 is configured to classify one or more users depicted in the social sharing graph data 226 in one or more predefined categories. The one or more users are classified based on scores assigned to preferably each of the one or more users. The scores are assigned by the user score manager 112. In an embodiment, the one or more predefined categories may include, but are not limited to information influencer category, information responder category, content-specific, interest-specific, brand-specific influencer and responder categories, etc.

The user profiling module 212 is configured to create a user profile for preferably each of the one or more users depicted in the social sharing graph G. The user profiling module 212 creates the user profile based on the one or more log records associated with preferably each of the one or more users. In an embodiment, the user profile may include, but is not limited to, user interests, user login credentials, scores assigned to the user, one or more categories in which the user has been classified, etc. The user profiling module 212 stores the user profile for preferably each of the one or more users in the user profile data 224.

The user score manager 112 is configured to assign a score to preferably each of the one or more users depicted in the social sharing graph G based on the one or more log records associated with each of the one or more users. In an embodiment, the user score manager 112 assigns the score based on the number and type of user activities performed by each of the one or more users. In an embodiment, the user score manager 112 assigns the score based on the context of the one or more log records and the number of user activities performed on web content related to the context depicted by the one or more log records. In yet another embodiment, the user score manager 112 assigns the score based on the relations to other users and the scores of other users. The user score manager 112 stores the score assigned to each of the one or more users in the user score data 222.

The tracking application module 214 is configured to receive one or more log records from the tracking application 116. The tracking application module 214 then stores the one or more log records in the tracking log 228. In an embodiment, the tracking application module 214 manages the subscription of having access to the tracking application 116 of the domain web server 110.

The content categorization module 220 categorizes the content on the web page in the tracking log 228 into predefined categories. Categories can further be sub-categorised representing specific levels of interests. In an example of implementation, the user visits a web page www.x11y22z33.com that displays content related to car sales in a particular geographical region. In an embodiment, the content is categorized as "automotive". In another embodiment, the categorized content could further be categorized as "sales" under the category "automotive". Further, the categories assigned to the content are stored in the tracking log 228.

The score comparing module 216 is configured to compare the score assigned to preferably each of the one or more users with a predefined threshold level. The score comparing module 216 stores comparison results in the user score data 222.

Figure 3:
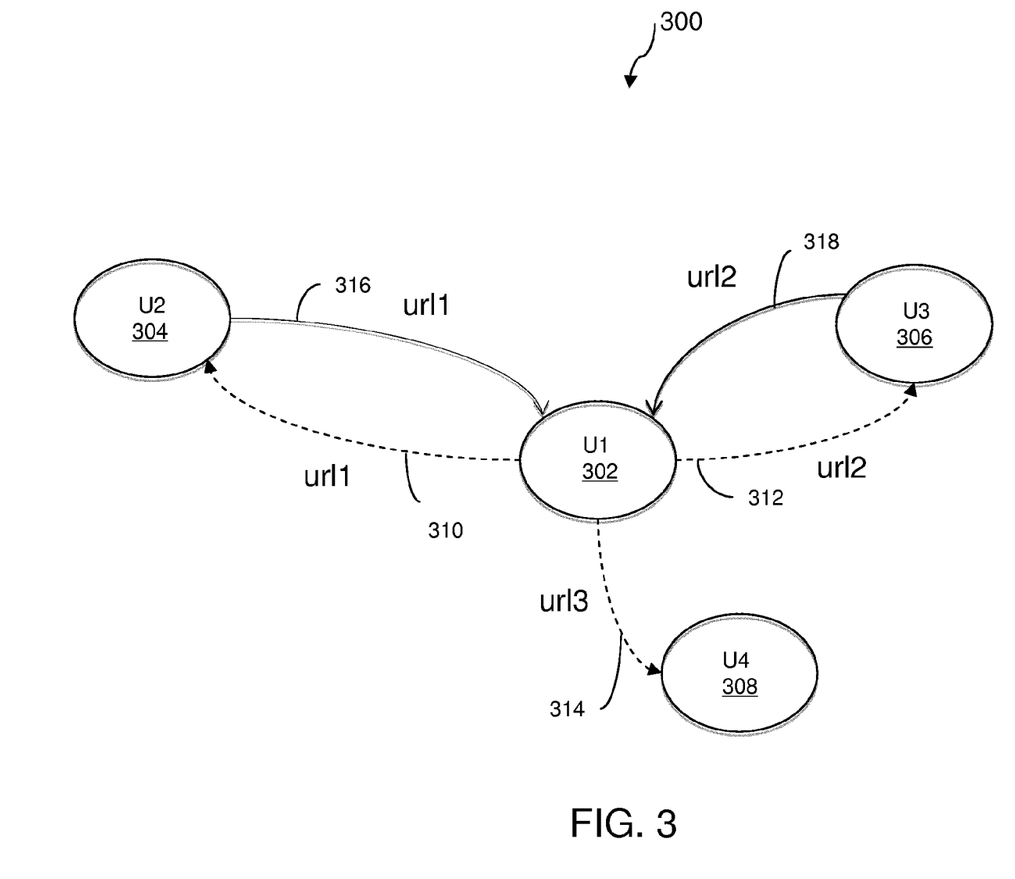
FIG. 3 illustrates a social sharing graph in accordance with an embodiment.

The social graph manager 218 is configured to generate the social sharing graph G=(N,E,W) with nodes N, edges E, and edge weights W based on the one or more log records from the tracking log 228. The social sharing graph data 226 contains the social sharing graph G. Nodes N represent users in the social network and hereafter may be interchangeably used. The social sharing graph G is a weighted, directed graph. The weighted edge is used to quantify the strength of links between users. The directed edge is used to indicate the fact in social relationship that reciprocal links do not necessarily exist between users. G is also a multi-edge graph as it contains both outgoing share edges (i.e., dashed lines in FIG. 3) and incoming click edges (i.e., solid lines in FIG. 3). The weight $w_{ij}$ on the arc i←j quantifies the relative influence of user i on user j with respect to other users. There are many ways to measure the edge weights W from the log records. In one embodiment, can represent the ratio that user j responds to user i's share, i.e.

$$w_{ij} = \frac{c_{ij}}{s_{ij}},$$

where $S_{ij}$ is the total number of URLs that user i shares with user j regardless of content category of the URLs, and $C_{ij}$ is the total number of clicks by user j on the URLs shared by user i. In a second embodiment, $w_{ij}$ represents another ratio that user j responds to user i's share, i.e.

$$w_{ij} = \frac{r_{ij}}{s_{ij}},$$

where $r_{ij}$ is total number of reshares (i.e., the number of retweeted URLs originated from user i by user j to other users in G on the URLs shared by user i). In another embodiment, $w_{ij}$ represent the clickback rate from user j to user i, i.e., the amount of clicks that user j responds to shares by user i to the total number of clicks on the shares from user i by all others users in G, i.e., $$w_{ij} = \frac{c_{ij}}{\sum_{k:(i,k)\in E} c_{ik}},$$

$$w_{ij} \in [0, 1]$$

or simply $w_{ij}=c_{ij}$, $w_{ij} \geq 1$, wherein $C_{ik}$ is the total number of clicks of all the users on the URLs shared by user i. k is a subset of users that belongs to (wherein "belongs to" is denoted by "$\in$") the total number of users associated with edges E of the social sharing graph G. In yet another embodiment, one can also build a composite edge weight $w_{ij}$ as a linear combination of those implementations in the aforementioned embodiments, where the coefficients for each implementation in the linear combination can be set manually or alternatively learned from those log records.

In an embodiment, the social sharing graph G adopts a rich annotation scheme, which is highly scalable and durable given the node-centric storage of the graph. That is, each edge can be associated with multiple URLs and each URL can have multiple labels, e.g., its top content categories, its related brand names, its social channel (indicating where it is shared or clicked), and/or its timestamp (indicating when it is shared or clicked). As stated earlier, the original $w_{ij}$ is computed by counting all edges that link user j to user i. Given the rich annotation on the edges, $w_{ij}$ can be conveniently extended to be demand-specific $w_{ij}^l$, e.g., $$w_{ij}^l = \frac{c_{ij}^l}{\sum_{k:(i,k)\in E} c_{ik}^l},$$

where l represents categories (e.g., topic, brand, social channel, time period, or a composite of aforementioned categories of interest). The other symbols represent the same as explained earlier. In other words, one can compute $w_{ij}$ on demand for topic, brand, social channel, or time period of interest by filtering out URLs that are irrelevant to the demand. This extension is advantageous for the parallel implementation of this algorithm described afterwards. Another nontrivial, good practice to compute $w_{ij}$ is to discount URLs receiving either too few or too many responses as both types of such URLs can be viewed as noises or spams. Typically, $w_{ij}$ will be fixed once it is computed unless there is a change on the social sharing graph structure, e.g., biweekly update of the social sharing graph G.

FIG. 3 illustrates a social sharing graph 300 in accordance with an embodiment. The social sharing graph 300 includes a plurality of nodes (e.g., U1 302, U2 304, U3 306, U4 308) representing one or more users in the network 104. In an embodiment, the social sharing graph 300 is indicative of one or more user activities performed by each of the one or more users. The sharing-out edges are represented with dashed lines and the clicking-back edges are represented with solid lines. For example, the user U1 302 shares "URL 1" with user U2 304 through edge 310, "URL 2" with the user U3 306 through edge 312, and "URL 3" with the user U4 308 through edge 314 respectively. The user U2 304 and the user U3 306 respond to U1 302 by clicking on the shared URLs. The social sharing graph 300 depicts the user U1 302 connected to users U2 304 and U3 306 through the edges 316 and 318 respectively. Though the user U1 302 has shared "URL 3" with the user U4 308 the latter did not respond by clicking back on the shared "URL 3". Note that the shares or clicks between users are asymmetric in general to reflect the fact that not all shares are clicked back by the share recipients.

Figure 4:
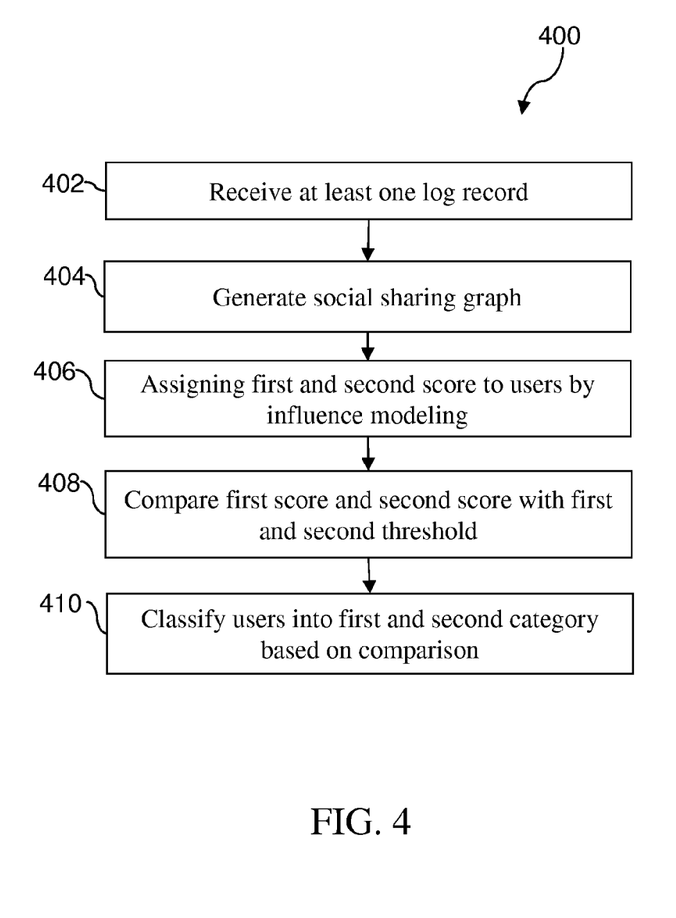
FIG. 4 illustrates a flowchart exemplifying a method for classifying one or more users in accordance with an embodiment.

FIG. 4 illustrates a flowchart 400 exemplifying a method for classifying one or more users in accordance with an embodiment. The flowchart 400 is explained in conjunction with FIG. 1, FIG. 2 and FIG. 3.

At step 402, the web analytic server 106 (refer to FIG. 1) receives one or more log records from the tracking component embedded in a web page hosted by the domain web server 110. The tracking application 114 tracks and stores the one or more user activities as the one or more log records. In an embodiment, the tracking application module 214 (refer to FIG. 2) in the web analytic server 106 receives the one or more log records from the domain web servers 110 and stores the one or more log records as the tracking log 228. The log record corresponds to the one or more activities of the plurality of users.

In an embodiment, the step 402 includes categorizing the content on the web page into one or more content categories. The content categorization module 220 gathers data from the tracking log 228 and categorizes the content on the web page associated with the corresponding log records into the one or more content categories based on the log records. In another embodiment, the content categorization module 220 stores the categorized content in the tracking log 228.

In another embodiment, the step 402 includes categorizing the one or more log records into different event types, e.g., sharing content, clicking on content, searching, viewing a page, visiting a brand page, visiting a social channel page, making a transaction, etc. The content categorization module 220 further stores the categorized event types in the tracking log 228.

In an embodiment, the step 402 further includes determining the one or more activities of the plurality of users on the web page. The user profiling module 212 retrieves the social sharing graph data 226 and determines the one or more activities of the plurality of users on the web page based on the log records. In another embodiment, the user profiling module 212 stores the determined one or more activities of the plurality of users as the user profile data 224.

In an embodiment, the one or more users perform the one or more user activities on an advertisement campaign served by an advertising server (not shown in FIG. 1). The tracking application module 214 retrieves one or more categories corresponding to the advertisement campaign, and determines the one or more activities of the plurality of users on the web page based on the log records. In an embodiment, the tracking application module 214 determines one or more users from the social sharing graph 300 that have performed one or more user activities on web content related to the one or more categories.

At step 404, the social graph manager 218 generates the social sharing graph 300 (refer to FIG. 3) based on the one or more log records in the tracking log 228. In an embodiment, the social sharing graph 300 can include various types of annotations on the nodes and edges. Various types of annotations include, but are limited to, labels, metadata, weights on edges to show the strengths of the connections, users' interested topics, topics or categories specific to a brand or an advertiser, category information of the edges, etc.

At step 406, the user score manager 112 assigns a first score corresponding to the influence score and a second score corresponding to the receptivity score to preferably each of the one or more users depicted in the social sharing graph 300 based on the type of user as explained in the following description. For assigning the first score and the second score, the user score manager 112 analyzes the one or more log records associated with preferably each of the one or more users depicted by a node (e.g. U1 302) in the social sharing graph 300. Further, based on the one or more log records, the user score manager 112 determines the one or more user activities performed by preferably each of the one or more users. Based on the one or more user activities, the user score manager 112 assigns the first score and the second score to preferably each of the one or more users depicted in the social sharing graph 300. In an embodiment, the user score manager 112 calculates a third score and a fourth score in step 406 for preferably each of the one or more users associated with each of the one or more categories. In an embodiment, the third score corresponds to the first score, and the fourth score corresponds to the second score.

At step 408, the score comparing module 216 compares the first score and the second score associated with preferably each of the one or more users with a first predetermined threshold value and a second predetermined threshold value respectively. If at least one of the first score and the second score exceeds the first predetermined threshold value or the second predetermined threshold value, step 410 is performed.

At step 410, the user classification module 210 classifies a first set of users from the one or more users in a first category and a second category based on comparison of the first score with the first threshold score. For example, if at step 408 it is determined that the first score associated with a user 1 has exceeded the first predetermined threshold value, the user classification module 210 categorizes the user 1 in the first category. Similarly, at step 408 if it is determined that the second score associated with a user 2 has exceeded the second predetermine threshold value, the user classification module 210 categorizes the user 2 in the second category. In an embodiment, the first category and the second category are an information influencer category and information responder category respectively. In another embodiment, for particular topics, content categories, social channels of interest to a brand, a marketing purpose, or an advertising purpose, the user classification module 201 classifies the information influencer and the information responder specific to the specified topics, content categories, or social channels as the third category or the fourth category.

In an embodiment, the web analytic server 106 generates a user model based on the categorization of the one or more users.

In an embodiment, the first score is the influence score and the second score is the receptivity score. The first score and the second score can be computed by a social influence modeling algorithm, Influence-Receptivity (IR) which is a derivative of the Hyperlink-Induced Topic Search (HITS) algorithm, known in the art. However, HITS assumes an unweighted, directed graph as input. This HITS algorithm can be extended to accommodate weighted edges in the social sharing graph 300. Such extension is advantageous as it faithfully reflects the asymmetric social relationship between users. The social sharing graph 300 is also designed to fit the Map-Reduce programming paradigm and thus is highly scalable to a large-scale social graph in the real world. Furthermore, the social sharing graph 300 with rich annotations of the nodes and edges supports the computation of influence and receptivity scores for multiple demands, e.g., multiple content categories corresponding to different brands or advertisers, in parallel rather than in sequence. The extension saves massive computational cost by requiring only one pass over the social sharing graph 300 for all demands rather than one for each demand. Similarly, it also alleviates the storage cost through a centralized storage of user scores for multiple demands. Like other link analysis algorithms, IR is an iterative algorithm. Both influence and receptivity scores are assigned initial values before the iteration starts. One common practice is to assign uniform values, e.g., 1, for the initial influence and receptivity scores of all users in the social sharing graph 300. It is also possible to assign non-uniform values to users based on prior knowledge. For example, while adjusting the influence/receptivity scores for an updated social sharing graph 300, one may initialize the scores with those previously computed two scores.

Figure 5:
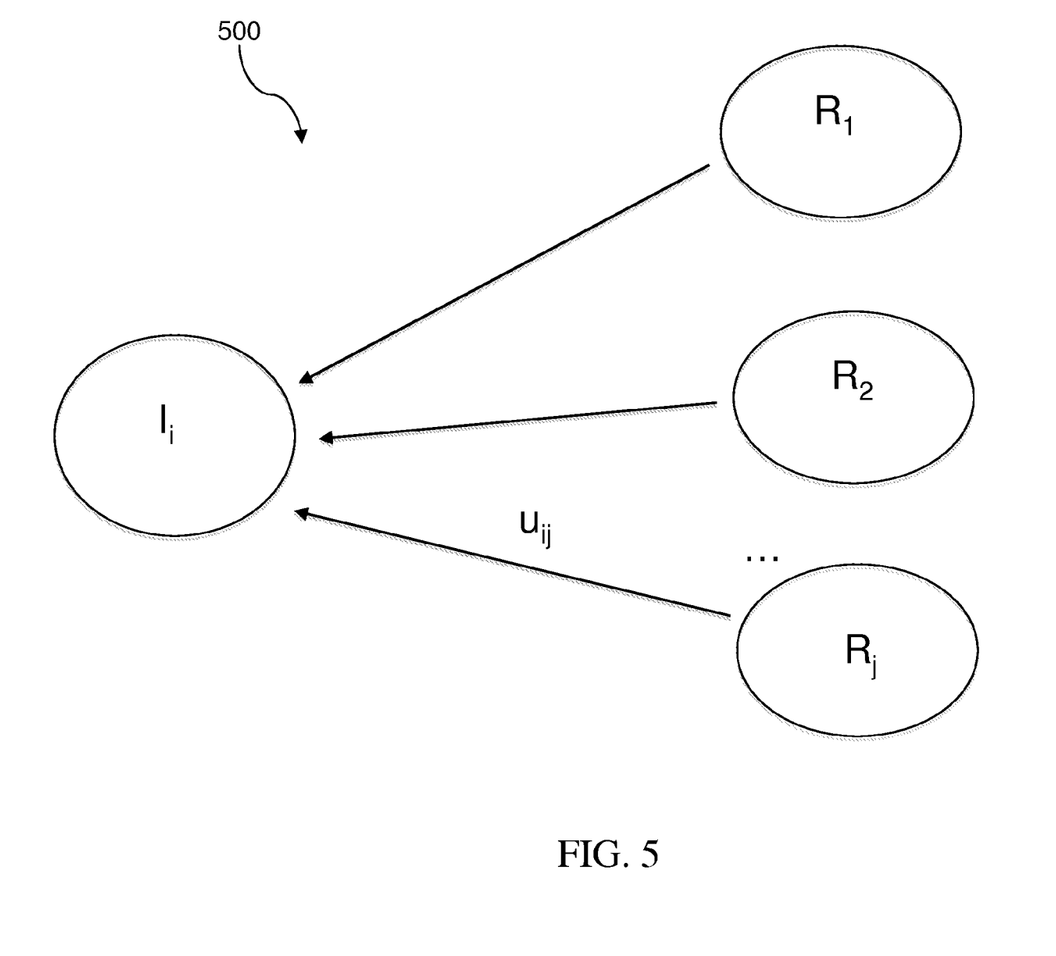
FIG. 5 illustrates a user activity graph in accordance with an embodiment.

FIG. 5 illustrates a user activity graph 500 in accordance with an embodiment. In the user activity graph 500, user i receives clickback activities from user 1, user 2, . . . , user j who are recipients and responders to the shares of the user i. In an embodiment, the influence score that measures how effective a sharer in inducing responses from other users, is iteratively updated using Equation (1):

$$I_i \leftarrow \Sigma_{j:(i,j) \in E} u_{ij}(1/R_j) \quad (1)$$

where $I_i$ is the influence score of user i at the current iteration, $R_j$ is the receptivity score of user j at the previous iteration, $(i,j) \in E$ is the set of incoming click edges of user i, i.e., all edges with user i as the destination node, and $u_{ij}$ is acceptance rate from user j to user i. In one embodiment, $u_{ij}$ can simply be $w_{ij}$ as discussed earlier. In another embodiment, $u_{ij}$ can be computed as the amount of acceptance (measured by number of clickbacks) that user i received from user j normalized by the total acceptance that user i received from all users in the social sharing graph G, i.e., $$u_{ij} = \frac{w_{ij}}{\sum_{k:(i,k) \in E} w_{ik}}.$$

Informally, equation (1) captures two assumptions behind the influence score: (1) the more share responders (i.e., share responses or clickbacks) a user has, the higher the user's influence score, and (2) the lower the share responder's receptivity score, the higher the user's influence score (as the user is able to influence a responder who is an influencer). $u_{ij}$ can be extended to be $u_{ij}^l$, i.e., $$u_{ij}^l = \frac{w_{ij}^l}{\sum_{k:(i,k) \in E} w_{ik}^l},$$

where l indexes topic, brand, social channel, time period of interest or a composite of aforementioned categories of interest and $w_{ij}^l$ is the clickback rate associated with the specific index l defined previously. The introduction of index l in effect focuses the computation to only the sub-graph of nodes and edges that are indexed by the specified topic, brand, social, channel, etc. It is worth noting that this extension will not affect the parallel nature of the algorithm. It is conveniently achieved through the annotation on the edge. Thus, equation (1) becomes $$I_i^l \leftarrow \Sigma_{j:(i,j) \in E} u_{ij}^l (1/E_j^l)$$

Figure 6:
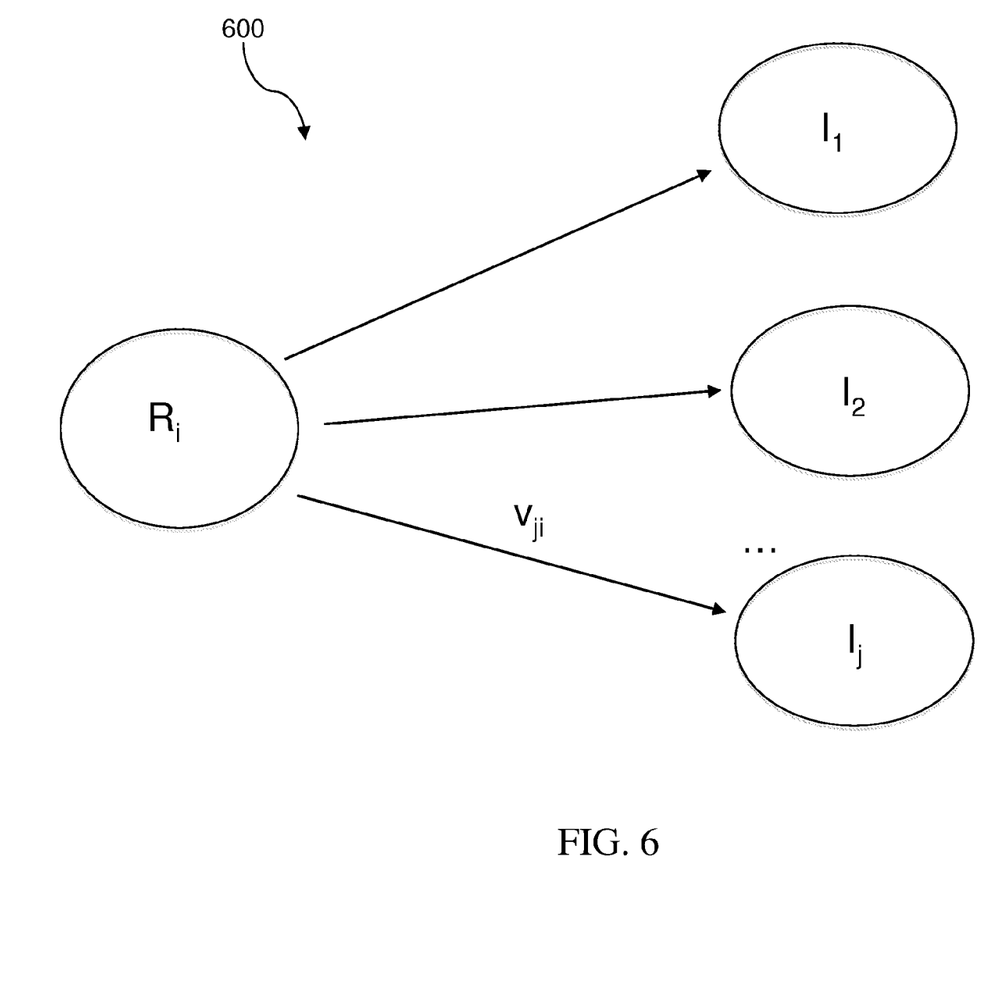
FIG. 6 illustrates a user activity graph in accordance with another embodiment.

FIG. 6 illustrates a user activity graph 600 in accordance with an embodiment. In the user activity graph 600, user i is influenced by user 1, user 2, . . . , user j. In an embodiment, the receptivity score, which measures how easily a user is influenced by a sharer, is iteratively updated using Equation (2):

$$R_i \leftarrow \Sigma_{j:(j,i) \in E} v_{ji}(1/I_j) \quad (2)$$

where $R_i$ is the receptivity score of user i at the current iteration, $I_j$ is the influence score of user j at the previous iteration, $(j,i) \in E$ is the set of outgoing click edges of user i, i.e., all edges with user j as the destination node, and $v_{ji}$ is the response rate from user i to user j. In one embodiment, $v_{ji}$ can be $w_{ji}$ which represents the number of clickbacks user j received from user i. In another embodiment, $v_{ji}$ can be computed as the amount of responses (e.g., measured by number of clickbacks) that user j received from user i normalized by the total responses that user j received from all users in the social sharing graph G, i.e., $$v_{ji} = \frac{w_{ji}}{\sum_{k:(j,k) \in E} w_{jk}}.$$

Informally, equation (2) captures two assumptions behind the receptivity score: (1) the more sharers (or shares) a user responds to, the higher the user's receptivity score, and (2) the lower the sharer's influence score, the higher the share responder's receptivity score.

As with $u_{ij}$, $v_{ij}$ can be extended to be $v_{ji}^l$, i.e., $$v_{ji}^l = \frac{w_{ji}^l}{\sum_{k:(j,k) \in E} w_{jk}^l}.$$

Thus, equation (2) becomes $$R_i^l \leftarrow \Sigma_{j:(j,i) \in E} v_{ji}^l (1/I_j^l)$$

The influence and receptivity scores computed at the current iteration described above will be used for the next iteration. At the end of each iteration, the I/R scores are preferably normalized, such that the I/R scores for all nodes in G sum up to one, which ensures a valid probability distribution and avoids score divergence. The influence and receptivity scores will be automatically updated until convergence, i.e., certain stopping criterion is met. One stopping criterion is comparing the score distribution between current and previous iterations. If the divergence of two distributions is below a threshold, the iterating process is stopped. In practice, the divergence of two distributions can be approximated by the difference of quartile representations between the two distributions. This representation is used for social sharing graph 300, as it is highly scalable to the large-scale data. In another embodiment, one can adopt the stopping criterion commonly used in popular link analysis algorithm, e.g., PageRank. That is, stop iteration when I/R scores of nodes change negligibly.

Referring to Equation (1), $I_i$ is inversely proportional to $R_j$. For example, a user 1 in the social sharing graph 300 shares content with user 2, user 3, and user 4. Out of the user 2, the user 3, and the user 4, the user 3 has a very low receptivity score. If the user 3 performs one or more user activities on the content shared by the user 1, then the user 1 will have a high influence score because the content shared by the user 1 compels the user 3 to perform one or more user activities on the shared content. Similarly, referring to Equation (2), the receptivity score $R_i$ is inversely proportional to the influence score $I_j$.

Referring to Equation (1), a user's influence score depends on the number of responders (or responds) the user's shares successfully induce and the receptivity scores of the share responders. In other words, the fact that one user successfully influences a group of easily receptive users doesn't mean he is socially influential. On the other hand, the user will be deemed influential if he or she can successfully influence those hard-to-be-influenced users, measured by number of clickbacks from them. Referring to Equation (2), a user's receptivity score depends on the number of sharers (or shares) a user responding to and the influence scores of the sharers. In other words, the fact that one user is influenced by a lot of influential users does not guarantee the user is easily susceptible. On the other hand, if the user can be influenced by a few but never influential users, it is a good sign of receptivity. A user's receptivity score also depends on how much he responds to others' influence compared to everyone else.

The social influence modeling algorithm can be used in user segmentation. With user segmentation it is possible to identify most influential users either at network level or topic level as well as their followers. It is also possible to identify most receptive users either at network level or topic level as well as their influencers. When delivering impressions to these people, one may expect a higher responsive rate than random selection of people in the network. In addition it is also possible to predict the favorability of URLs shared. If the URL is shared by a very influential user it can be expected to be clicked by others. If in turn it is clicked by some receptive users it can be reasonably expected to be re-shared, re-tweeted, or re-propagated through the network. This is a valuable feature to a publisher who may want to see how much referral traffic the URLs can attract and also how far its URL can propagate in the social network, i.e., the life span of the URLs. It also has many practically useful applications to social media analysis and online advertising. First, the influence score and the receptivity score inform the users how influential they are with their networks on certain topics and in certain social channels, as well as how easily influenced they are by their connections on certain topics and via certain channels. Since both scores are updated during iteration through score propagation throughout the entire network, the scores measure the global influence of users rather than the local influence measured only based on their friendship circles. Secondly, both scores can be beneficial to publishers. For example, publishers can know not only how social their content is but also who are engaged with the content, and the social influence and receptivity scores of those content consumers and broadcasters. The influence score can serve as a predictor on the popularity of one blog or post, e.g. one blog may travel faster and wider in the social network if it is shared, clicked and re-shared by influential users. Lastly, influence modeling can be beneficial to advertisers. The media buying agent can use this social influence algorithm to segment users into categories, e.g., social influencers and followers across multiple sub-categories representing specific level of interests (explained earlier) for audience targeting, and influencers and followers specific to a brand. For example, targeting those highly influence users for viral marketing purpose could lead to optimal return-on-investment, and targeting users with high receptivity could lead to higher click-through rate (CTR) or conversion rate.

The disclosed methods and systems, as described in the ongoing description or any of its components, may be embodied in the form of a computer system. Typical examples of a computer system include, but are not limited to, a general-purpose computer, a programmed microprocessor, a microcontroller, a peripheral integrated circuit element, and other devices or arrangements of devices that are capable of implementing the steps that constitute the method of the present disclosure.

The computer system comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system may also include a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a customer through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks such as the steps that constitute the method of the present disclosure. The method and systems described can also be implemented using only software programming or using only hardware or by a varying combination of the two techniques. The disclosure is independent of the programming language used and the operating system in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the present disclosure. The software may also include modular programming in the form of object-oriented programming. The processing of input data by the processing machine may be in response to customer commands, results of previous processing or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a non-transitory computer-readable medium. The programmable instructions can also be transmitted by data signals across a carrier wave. The disclosure can also be embodied in a computer program product comprising a non-transitory computer-readable medium, with the product capable of implementing the above methods and systems, or the numerous possible variations thereof.

While various embodiments have been illustrated and described, it will be clear that the disclosure is not limited to these embodiments only. Numerous modifications, changes, variations, substitutions, and equivalents will be apparent to those skilled in the art without departing from the spirit and scope of the disclosure as described in the claims.

What is claimed is:

1. A method for characterizing one or more users accessing a plurality of web pages, the method comprising:
    generating a social sharing graph based at least in part on at least one log record received from a tracking component located on the plurality of web pages, the at least one log record corresponding to one or more user activities of the one or more users on the plurality of web pages, wherein, the social sharing graph is indicative of a relationship between the one or more users;
    assigning a first score and a second score to the one or more users depicted in the social sharing graph based at least in part on the at least one log record, the first score indicative of an information influencing capability and the second score indicative of an information receptive capability of the one or more users;
    comparing the first score and the second score with a first threshold score and a second threshold score respectively;
    classifying a first set of users from the one or more users into a first category based at least in part on the comparison of the first score with the first threshold score; and
    classifying the one or more users into a second category based at least in part on the comparison of the second score with the second threshold score,
    wherein the above steps are performed by a computer.

2. The method of claim 1, wherein the one or more user activities of the one or more users correspond to one or more of viewing a web page, opening the tracking component, sharing through the tracking component, and clicking on shared web pages.

3. The method of claim 1, wherein the at least one log record comprises at least one of a cookie representing the one or more users, a timestamp, an event type, a sharing channel, a content identifier, domain information, URL, referring URL, and browser agent.

4. The method of claim 1 further comprising categorizing the at least one log record into one or more content categories based at least in part on content on the plurality of web pages associated with the at least one log record.

5. The method of claim 4 further comprising calculating a third score and a fourth score for the one or more users for at least one content category of the one or more content categories based at least in part on a user activity corresponding to the content category.

6. The method of claim 5 further comprising creating a user profile for the one or more users based at least in part on the third score and the fourth score, wherein the user profile at least includes user interests.

7. The method of claim 1, wherein the first score depends on the at least one log record and the respective second scores of the one or more users other than the user.

8. The method of claim 1, wherein the second score depends on the at least one log record and the respective first scores of the one or more users other than the user.

9. The method of claim 1, wherein the first category corresponds to an information influencer category and the second category corresponds to an information responder category.

10. A computer system for user classification comprising:
    a computer having one or more processors configured to:
        receive at least one log record corresponding to one or more user activities of one or more users on a plurality of web pages;

generate a social sharing graph based at least in part on the at least one log record, wherein, the social sharing graph is indicative of a relationship between the one or more users;

assign a first score and a second score to the one or more users depicted in the social sharing graph based at least in part on the at least one log record associated with the one or more users;

compare the first score and the second score with a first threshold score and a second threshold score respectively, the first score indicative of an information influencing capability and the second score indicative of an information receptive capability of the one or more users; and classify the one or more users into a first category and a second category based at least in part on the comparison of the first score and the second score respectively with the first threshold score and the second threshold score.

11. The computer system of claim 10 wherein the one or more processors are further configured to determine the one or more user activities of the one or more users on the plurality of web pages based on the received at least one log record.

12. The computer system of claim 10, wherein the one or more processors are configured to calculate a third score and a fourth score for the one or more users corresponding to at least one content category of one or more content categories based at least in part on the one or more user activities corresponding to the content category.

13. The computer system of claim 12, wherein the one or more processors are configured to create a profile of the one or more users based at least in part upon the third score and the fourth score in the content category.

14. A non-transitory computer readable medium having stored thereon, a computer program having at least one code section executable by a computer, thereby causing the computer to perform steps comprising:

generating a social sharing graph based, at least in part, on at least one log record received from a tracking component located on a plurality of web pages, the at least one log record corresponding to at least one or more activities of one or more users on the plurality of web pages, wherein, the social sharing graph is indicative of a relationship between the one or more users;

assigning a first score and a second score to the one or more users depicted in the social sharing graph based at least in part on the at least one log record, the first score indicative of an information sharing capability and the second score indicative of an information responding capability of the one or more users;

comparing the first score and the second score with a first threshold score and a second threshold score respectively; and generating a user model based at least in part on the comparing, wherein the user model comprises a plurality of categories assigned to the one or more users.

15. The non-transitory computer readable medium of claim 14 further comprising:

classifying the one or more users into a first category based at least in part on the comparison of the first score with the first threshold score; and classifying the one or more users into a second category based at least in part on the comparison of the second score with the second threshold score.

16. The non-transitory computer readable medium of claim 15, wherein the first category corresponds to an information influencer category and the second category corresponds to an information responder category.

17. The non-transitory computer readable medium of claim 14, wherein the first score depends on the at least one log record and the respective second scores of the one or more users other than the user.

18. The non-transitory computer readable medium of claim 14, wherein the second score depends on the at least one log record and the respective first scores of the one or more users other than the user.

19. The non-transitory computer readable medium of claim 14, wherein generating the user model comprises calculating a third score and a fourth score respectively of the one or more users corresponding to one or more content categories based at least in part on the one or more user activities corresponding to the one or more content categories from a plurality of categories.

* * * * *